C. F. JENKINS.
VALVE.
APPLICATION FILED JAN. 5, 1912.

1,047,531.

Patented Dec. 17, 1912.

Witnesses
Edwin L. Bradford
Robert Craig Greene

Inventor
Charles Francis Jenkins
By Wallace Greene,
Attorney

UNITED STATES PATENT OFFICE.

CHARLES FRANCIS JENKINS, OF WASHINGTON, DISTRICT OF COLUMBIA.

VALVE.

1,047,531. Specification of Letters Patent. Patented Dec. 17, 1912.

Application filed January 5, 1912. Serial No. 669,613.

*To all whom it may concern:*

Be it known that I, CHARLES FRANCIS JENKINS, citizen of the United States, residing at Washington, in the District of Columbia, have invented certain new and useful Improvements in Valves, of which the following is a specification, reference being had therein to the accompanying drawing.

This invention relates to valves adapted to be opened by pressure of fluid upon one side and to be unaffected by suction or any other condition upon the opposite side.

The apparatus may be used in a variety of situations, but in this instance it has been shown as used for supplying compressed fluid to engines usually operated by internal combustion.

Figure 1:
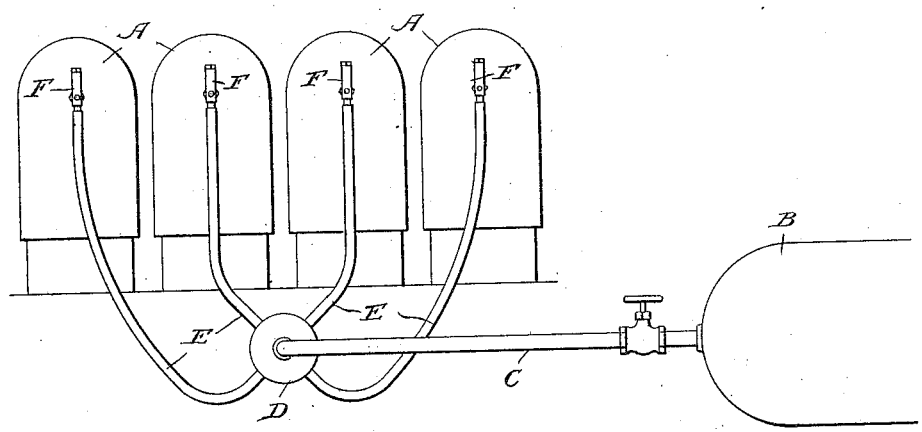
Figure 2:
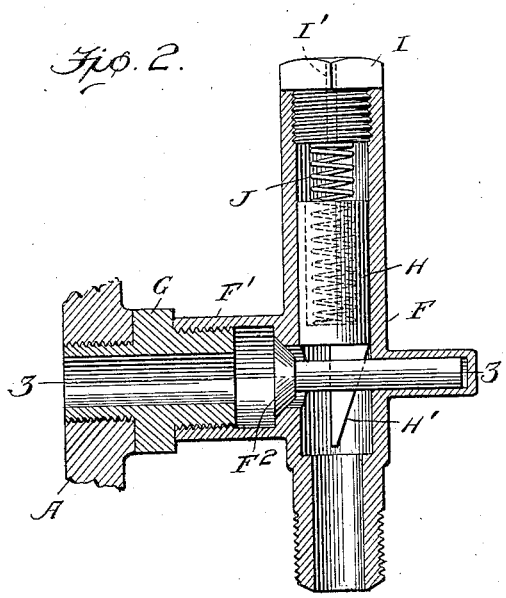
Figure 3:
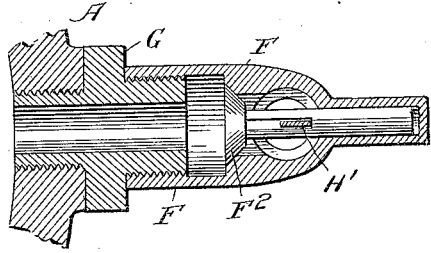

In the accompanying drawings, Figure 1 shows several of the novel valves as applied to the cylinders of a common internal combustion engine apparatus. Fig. 2 is an axial section of one of the valve mechanisms. Fig. 3 is a section on the line 3—3, Fig. 1.

In these figures, A, A represent ordinary cylinders of internal combustion engines, B shows a reservoir for compressed fluid, usually under high pressure, C a hand-valve controlled conduit leading from the reservoir to a distributer D, without novelty herein claimed, and E, E conduits leading from the distributer to novel valve devices F, F located on the cylinders, respectively. The valve casing is a T-like tube, the stem F' being bored to form a seat for a common valve F² and internally threaded to receive a coupling G connecting it with the engine cylinder. The head of the T-like casing is bored from end to end, its interior communicating with the interior of the stem, and upon one side of the stem is provided with a plunger H having a wedge-like blade H' which projects through a slot in the stem of the valve F² and, when the parts are in proper position for that purpose, prevents opening of the valve. The outer end of that portion of the passage in which the plunger lies is closed by a screw plug I having a small aperture I' so that the air next the plunger may be practically free. A light spring J is placed between the plug and plunger to resist outward movement of the latter. In some cases this spring may be omitted, but under the conditions here supposed its presence is desirable.

The parts being assembled as shown, immediately upon the opening of the conduit C the compressed fluid in the reservoir passes to the distributer and thence, through such conduit E as may be open, to the corresponding valve casing. Here it pushes back the plunger withdrawing the locking wedge and at the same time opens the valve and enters the engine cylinder, actuating its piston and thereby opening the other conduits in proper succession. The engine is thus operated as a compressed fluid motor, simply, provided that no explosive mixture is admitted and fired. It is obvious that whenever the compressed fluid is cut off from any of the valve mechanisms, either by hand or by the distributer, the corresponding valve will be closed and locked tightly by the wedge H' acted upon by the spring J.

If proper fuel be supplied to the cylinders and ignition be provided for, the compressed fluid may be cut off while the engine is operating, and thereafter the engine will operate as an internal combustion engine; and with proper fuel it is quite possible to pass from the one motive power to the other, or to a condition in which much of the power comes from explosions, without cutting off the compressed fluid. It is also possible to use fuel as the compressed fluid and to add the power of explosion to the high expansive force of the fluid in the reservoir as soon as sparking occurs. In any case, suction in the cylinder has no opening effect upon the valve. It is also to be noted that the parts beyond the valve proper are in no case subjected to the action of the products of combustion and that they are therefore unlikely to become fouled or to lose their sensitive action.

What I claim is:

1. The combination with a valve adapted to be opened by fluid pressure upon one side thereof, of devices arranged to lock the valve positively in closed position whenever such pressure is lacking.

2. The combination with a valve casing and a reciprocating valve therein openable in one direction by fluid under pressure, of a normally engaged positive valve lock arranged to be held out of engagement by such fluid while the latter acts upon the valve.

3. The combination with a valve casing, of a reciprocating valve therein openable by the pressure of fluid thereon, a reciprocating valve lock normally holding the valve closed, and means whereby fluid under pressure admitted to the valve also reaches the lock and slides it out of locking position as the valve opens.

4. The combination with a valve casing, of a valve reciprocating in the casing and provided with a stem, a plunger sliding transversely in the casing to lock and release said stem, and means for admitting compressed fluid to both the plunger and valve to slide the plunger and release the stem and simultaneously open the valve.

5. The combination with a T-like tubular valve casing having its stem adapted to be fixed in communication with the interior of an engine cylinder, of a valve controlling the passage in said stem, a valve-engaging plunger sliding in the head of the casing at one side of said stem, a spring resisting movement of the plunger toward valve releasing position, and means for admitting compressed fluid to the opposite end portion of said head.

6. The combination with a valve casing and a valve therein openable in one direction by fluid pressure, of automatic means for forcibly restoring the valve to closed position and positively locking it when the fluid pressure ceases.

In testimony whereof I affix my signature in presence of two witnesses.

CHARLES FRANCIS JENKINS.

Witnesses:
    JAMES L. CRAWFORD,
    ROBERT CRAIG GREENE.

---

Copies of this patent may be obtained for five cents each, by addressing the "Commissioner of Patents, Washington, D. C."